US008255404B2

(12) United States Patent (10) Patent No.: US 8,255,404 B2
Lotito et al. (45) Date of Patent: Aug. 28, 2012

(54) METHOD FOR CLASSIFYING WEB PAGES AND ORGANISING CORRESPONDING CONTENTS

(75) Inventors: Gianpiero Giuseppe Lotito, Pavia (IT); Mariuccia Teroni, Pavia (IT)

(73) Assignee: Mouldtec Ontwerpen B.V. (NL)

( * ) Notice: Subject to any disclaimer, the term of this patent is extended or adjusted under 35 U.S.C. 154(b) by 53 days.

(21) Appl. No.: 12/519,925

(22) PCT Filed: Dec. 19, 2007

(86) PCT No.: PCT/EP2007/011183
§ 371 (c)(1),
(2), (4) Date: May 3, 2010

(87) PCT Pub. No.: WO2008/074486
PCT Pub. Date: Jun. 26, 2008

(65) Prior Publication Data
US 2010/0241633 A1 Sep. 23, 2010

(30) Foreign Application Priority Data

Dec. 19, 2006 (IT) ............................... MI2006A2436

(51) Int. Cl.
*G06F 17/30* (2006.01)
(52) U.S. Cl. ..................................................... 707/748
(58) Field of Classification Search ................... 707/748
See application file for complete search history.

(56) References Cited

U.S. PATENT DOCUMENTS 6,334,145 B1 * 12/2001 Adams et al. ................. 709/217
7,428,533 B2 * 9/2008 Kapur et al. .......................... 1/1
7,620,628 B2 * 11/2009 Kapur et al. .......................... 1/1
7,707,201 B2 * 4/2010 Kapur et al. .................. 707/706
2005/0080770 A1 * 4/2005 Lueder et al. ..................... 707/3
2006/0122979 A1 * 6/2006 Kapur et al. ....................... 707/3

OTHER PUBLICATIONS

Selberg, et al., "The Metacrawler Architecture for Resource Aggregation on the Web," *IEEE Expert*, Jan. 1, 1997, pp. 11-14, 12:1, XP000689719, ISSN: 0885-9000, IEEE Service Center, New York, New York, US.

(Continued)

*Primary Examiner* — Sheree Brown
(74) *Attorney, Agent, or Firm* — Fleit Gibbons Gutman Bongini & Bianco PL; Stephen Bongini

(57) ABSTRACT

A method for classifying Web pages and organising their contents comprises a recording step of a plurality of Internet addresses, comprising executions of a plurality of automatic recording processes of the plurality of Internet addresses, and a selection step, for setting a corresponding pertinence value to said plurality of Internet addresses. The selection step sets the corresponding pertinence value to a pertinence value proportional to a hit thereof in the plurality of Internet addresses and selects the Internet addresses with pertinence value greater than a predetermined threshold value; the method further comprises a reduction step, which, starting from the Internet addresses with pertinence value greater than the threshold value, reduces the Internet addresses to the Internet addresses meeting one or more essentiality criteria, and a validation step for validating a subset of the Internet addresses meeting the essentiality criteria; the validation step comprises a human action.

19 Claims, 6 Drawing Sheets

OTHER PUBLICATIONS

Shakes, et al., "Dynamic Reference Sifting: A Case Study in the Hompage Domain," *Computer Networks and ISDN Systems*, Sep. 1, 1997, pp. 1193-1204, 29:8-13, XP004095316, ISSN: 0169-7552, North Holland Publishing, Amsterdam, Netherlands.

Oztekin, et al., "Expert Agreement and Content Based Reranking in a Meta Search Environment Using Mearf," *International World Wide Web Conference, XX, XX*, May 7, 2002, pp. 333-344, XP002404254.

Attardi, et al., "Automatic Web Page Categorization by Link and Context Analysis," *Proceedings of THAI, European Symposium on Telematics, Hypermedia and Artificial Intelligence, XX, XX*, Jan. 1, 1999, pp. 105-119, XP002351145.

Ester, et al., "Web Site Mining: A New Way to Spot Competitors, Customers and Suppliers in The World Wide Web," *KDD '02: Proceedings of the Eighth ACM SIGKDD International Conference on Knowledge Discovery and Data Mining*, Jul. 23-26, 2002 Online Jul. 26, 2002, pp. 249-258, XP002482328, Edmonton, Alberta, Canada, ISBN: 1-58113-567-X, Retrieved from Internet http://doi.acm.org/10.1145/775047.7750 84 (May 29, 2008).

International Search Report dated Jun. 3, 2008 for PCT/EP2007/011183.

* cited by examiner

FIG. 1a
PRIOR ART

"leonardo da vinci" - Cerca con Google     Pagina 1 di 2

Accesso

Google

Web   Immagini   News   Maps<sup>Novità!</sup>   Gruppi   Desktop   altro »

"leonardo da vinci"    [Cerca]   Ricerca avanzata / Preferenze

Cerca: ◉ Il Web   ○ pagine in Italiano   ○ pagine provenienti da: Italia

Web      Risultati 11 - 20 su circa 3.880.000 per "leonardo da vinci". (0,03 secondi)

— 4 leonardo da vinci
Leonardo da Vinci è il Programma d'azione dell'Unione Europea che si propone di attuare una politica di formazione professionale. Il Programma in Italia è ...
www.programmaleonardo.net/leo2/leonardo2.htm - 1k - Copia cache - Pagine simili

Leonardo da Vinci - Wikipedia, la enciclopedia libre
Información sobre la vida y obra del pintor italiano.
es.wikipedia.org/wiki/Leonardo_da_Vinci - 143k - Copia cache - Pagine simili

IL MUSEO LEONARDIANO DI VINCI
Museo Leonardiano di Vinci Castello dei Conti Guidi I 50053 VINCI - FI - Tel: +39-571-56055 Direttore del Museo e della Biblioteca: Dr. Romano Nanni E-mail: ...
www.leonet.it/comuni/vincimus/vincimus.html - 5k - Copia cache - Pagine simili

L'automobile di Leonardo da Vinci - Istituto e Museo di Storia ...
Presenta dati storici, modelli, ricostruzioni, fonti, bibliografia. A cura dell'istituto e museo di storia della scienza di Firenze.
brunelleschi.imss.fi.it/automobile/ - 1k - Copia cache - Pagine simili

Leonardo da Vinci - [ Traduci questa pagina ]
The Museum of Science presents an online exhibition with biography, portrait, examples of da Vinci's work and background information on the Renaissance.
www.mos.org/leonardo/ - 18k - Copia cache - Pagine simili

Leonardo da Vinci - Wikipedia
Dieses Jahr war auch für Leonardo da Vinci von besonderer Wichtigkeit. Dokumenten zufolge plante er während einer mehrmonatigen Abwesenheit aus Mailand ...
de.wikipedia.org/wiki/Leonardo_da_Vinci - 138k - Copia cache - Pagine simili

Leonardo da Vinci - Wikipedia, the free encyclopedia - [ Traduci questa pagina ]
Giorgio Vasari, in his "Lives of the Artists", in its enlarged edition of 1568 (8) introduces his chapter on Leonardo da Vinci with the following words: ...
en.wikipedia.org/wiki/Leonardo_da_Vinci - 215k - Copia cache - Pagine simili

Benvenuti nel Centro Ricerche "Leonardo da Vinci" sez. Cosenza e ...
Una nuova gratificante collaborazione per la nostra associazione Annamaria "Lilla" Mariotti sarà presente sulle pagine del nostro sito alla sezione ...
www.leonardodavincics1.it/ - 7k - Copia cache - Pagine simili

Leonardo da Vinci - Anatomical drawings
Leonardo da Vinci - Mother and Child in Italian High Renaissance. Leonardo da Vinci. Anatomical drawings. Web, www.gfmer.ch ...
www.gfmer.ch/International_activities_En/Leonardo_anatomical_drawings.htm - 12k - Copia cache - Pagine simili

WebMuseum: Leonardo da Vinci - [ Traduci questa pagina ]
Collection of paintings and information on the great master.
www.ibiblio.org/wm/paint/auth/vinci/ - 5k - Copia cache - Pagine simili Ricerche correlate a: "leonardo da vinci"

| leonardo da vinci biografia | leonardo da vinci opere | la gioconda | storia di leonardo da vinci | http://www.google.it/search?q=%22leonardo+da+vinci%22&hl=it&start=10&sa=N     10/12/2007

METHOD FOR CLASSIFYING WEB PAGES AND ORGANISING CORRESPONDING CONTENTS

FIELD OF APPLICATION

The present invention relates to a method for classifying Web pages and organising corresponding contents of the type comprising a recording step of a plurality of Internet addresses, comprising executions of a plurality of automatic recording procedures, and a selection step for setting a corresponding pertinence value to the plurality of Internet addresses.

PRIOR ART

As is well known, a personal computer connected to the Internet network and equipped with a browser permits displaying Web pages.

In particular, with the term personal computer it is intended an electronic device equipped with an Internet network connection interface, while with the term browser, per se known software is referred to which is installed on such electronic device for the display of the Web pages. One example of such browser is the program Internet Explorer of the Microsoft® company.

Still more in particular, the Web pages are stored on a plurality of servers, in turn connected with the Internet network. An Internet address of a Web page is specified through the browser, for example in an upper portion or bar of the browser, and such Internet address is submitted for the display of the corresponding Web page, generally in a main portion of the browser.

Identification scripts or programs of one or more Web pages are also known, functioning on the basis of a search criterion which is set by a user.

Such identification scripts or programs are generally accessible by means of a graphic interface, for example they can be drawn by the browser, which comprises an insertion portion of the search criterion and an activation button of the identification script or program.

Given the great number of Web pages available on the Internet network, an identification script or program provides a high number of Web pages for a predetermined search criterion.

In order to guide the user to an effective consultation of such Web pages, the identification script or program is supported by a classification method, which assigns a corresponding importance to each Web page. In other words, the execution of an identification script or program provides the user with a list of Web pages, ordered by importance value established by the classification method.

One known classification method, commonly indicated with the term PageRank, provides associating a Web page with an importance value commonly indicated as rank. In particular, the rank of a Web page A is determined by the number of additional Web pages B1, . . . , Bx that make reference to such Web page A, i.e. that contain a pointer thereto.

Still more in particular, according to the classification method known as PageRank, every Web page can express a vote regarding other Web pages, through pointers, also known as connections. In other words, through the connections available on a starting web page, a user can be connected to one or more destination Web pages, increasing its rank. Generally, the higher the popularity of a Web page, i.e. the number of connections thereto, the higher the value of the votes that the same page can express.

The classification methods of the above-indicated type nevertheless have various limitations, which will appear evident from the following description.

With reference to FIG. 1, an interface 10 is considered for the activation of an identification script or program of Web pages.

The interface 10 is for example a Web page comprising an insertion bar or portion 1 of a search criterion and an activation button 2, to activate the identification script or program.

As an example, in FIG. 1 a search criterion is set for identifying Web pages pertaining to the Italian inventor and artist Leonardo da Vinci. In this simple example, the search criterion is given by the linking of the three key words "Leonardo", "da" and "Vinci", specified in the insertion bar 1 of the interface 10.

In such case, a main portion 4 of the interface 10 displays the results of the identification script or program after an execution thereof, based on the search criterion "Leonardo da Vinci". The search results comprise a list 3 of Internet addresses of Web pages, of which only the first hits 3a-3h are displayed in such main portion 4.

In fact, the number of identified Web pages being very high, in the specified example on the order of millions of Web pages, the identification script or program provides for their grouping inside a graphical interface 10 in subsequent pages to be displayed. Generally, a sequence of numbers from 1 to n, not represented in the figure being per se conventional, is available for example in a lower portion of the interface 10, so to display, in the main portion 4 and upon the user's request, a specific page and thus a portion of the list 3 of Internet addresses.

For example, supposing that the identification script or program has identified one hundred Web pages, corresponding to a list 3 of one hundred Internet addresses, and supposing that every display page comprises ten addresses of such identified Web pages, the lower portion of the interface 10 would indicate numbers from one to ten. In such a manner, the selection of the number one in the lower portion permits displaying, inside the main portion 4, the Internet addresses from one to ten, i.e. the first page of the list 3 of Web pages. In particular, in the current identification scripts or programs, the Internet addresses of the list 3 of Web pages are placed in a succession corresponding to a decreasing order of importance, as identified by the corresponding classification method, and therefore the selection of page one of the list 3 corresponds to the Web pages classified as most important by such classification method.

The selection of the number two permits displaying the Internet addresses from eleven to twenty in the same main portion 4 of the interface 10. Such Internet addresses correspond to a second page of the Web page list 3. The selection of the number ten in the lower portion makes reference to the last page of the list 3, associated therefore with the least relevant Web pages, always according to the classification method used by identification script or program.

In other words, the display order of the search results derives from the classification method.

Still more in particular, with reference to FIG. 1, the Web page 3a is that with the greatest importance among all the Web pages identified by the classification method used in the Google® program, used as example for such FIG. 1, and refers to an Internet service called Wikipedia, which provides the definition of the inventor and artist Leonardo da Vinci.

The Web page 3b refers to a Web page which describes the legacy left humanity by the inventor and artist Leonardo da Vinci; Web page 3c refers to the National Museum of Science and Technology; Web page 3e refers to the Rome airport "Leonardo da Vinci".

From the above-listed results of the Google program, which represents the first five hits in order of importance, it is inferred that the classification method based on PageRank has the following limitations.

The number of Web pages provided by the identification script or program is redundant: in this case, in the first eight results of the first page, a good three pages, in particular pages 3d, 3f and 3h are redundant, i.e. they repeat Internet addresses inside a same, previously displayed site, respectively the Internet addresses 3c, 3e and 3g. Moreover, a user does not generally read more than several dozen results provided by the identification method, result often obtained also for rather generic search criterion.

Although some Web pages provided by the identification script or program are not very or not at all pertinent with respect to the information searched by the user, they still enjoy an overly high rank. Web page 3e is considered: it is hard to believe that a user interested in the "Leonardo da Vinci" airport would insert as search criterion "Leonardo da Vinci" without specifying "Airport". Nevertheless, unexpectedly, Web page 3e, which refers to the Rome airport, is found as fifth hit of the results of the Google program. The Web page 3e constitutes a typical result example affected by information noise and therefore highly undesirable since it is not only not pertinent but also useless for the purpose of the search undertaken. It is possible to verify that one such result, i.e. the presence of the address of the Rome Airport in a high rank of list 3 of Web pages resulting from setting the search criterion "Leonardo da Vinci", is obtained by using many of the currently available search scripts or programs.

Therefore, the classification method based on PageRank, while providing an automated organisation of the Web pages, does not allow the user to concentrate on a reduced number of results, limited to the results which are most pertinent for the user.

Another drawback of the known classification method arises for the fact that, after an execution, the identification script or program reports, as a number of Web Pages found, a number which does not correspond to the real number of Web pages identified and effectively available to the user.

For example, with reference to FIG. 1a, the number of Web pages declared to be available by the identification script or program, as a result on the search criterion "Leonardo Da Vinci", is 3.880.000 but it is easy to verify by practise that only the first 1.000 Web pages are effectively available. More particularly, FIG. 1b shows an error message generated by a known identification program, reporting that no more than 1.000 results identified are available for the user. Thus, the number of Web pages declared to be available is trivial because a user believes to have a substantially infinite amount of Web pages associated to the result of the search criterion and he is discouraged by opening several Web pages, especially if he does not find the interested content in the first, high rank Web pages.

The above-described Web page classification methods moreover have further problems substantially associated to the reliability of the sources, intended as notoriety, recognisability and credibility of the source with respect to the set search criterion. In other words, a Web page effectively correlated to the inventor and artist Leonardo da Vinci could enjoy a high rank but contain incorrect information: for example, erroneous information on his date of birth or lacking important content, such as some of his most famous works or other fundamental indications regarding his life and his work, which would logically interest a user who had set the search criterion "Leonardo da Vinci".

Thus, a Web page of high rank could be pertinent while not having sufficient source reliability, such as in the case of page 3b, related to a page made by a private user, not an authoritative source.

On the contrary, a Web page correlated to the inventor Leonardo da Vinci could contain a plurality of information which is not strictly correlated and is substantially superfluous, slowing the identification of the information of user interest—a typical example of low relevancy information. In substance, the classification methods of currently available Web pages do not permit an identification script or program to conduct a search which has as result a pertinent, expected and filtered list of Web pages; rather, they act as collectors of a plurality of information with quite limited relation to a search criterion set by the user.

In such a manner, the known classification methods oblige the user to conduct an arduous filtering and selection operation, substantially aimed to identify, from among all the Web pages provided by the identification script or program, only the ones of interest, with the risk of missing Web pages of considerable importance.

The technical problem underlying the present invention is that of devising a classification method of Web pages that permits an identification script or program to provide results which are free of information noise, pertinent to the search criterion set by the user, not redundant for repetition of Web pages, and reliable for their content, while at the same time reducing the time employed by the user in order to filter the search results and resolving the limitations which still affect the Web page classification methods according to the prior art.

SUMMARY OF THE INVENTION

The solution idea underlying the present invention is that of providing a method for classifying and organising corresponding contents capable of determining, beginning from a Web configuration for thematic areas and lemmas, a set of Web pages which are considered to be pertinent, using as source both different search engines and directed spidering actions.

The spidering actions are carried out towards sites considered reliable in the web configuration step.

On the basis of this set of Web pages, a selection is carried out which eliminates the redundant Web pages, associated for example with different translations of the same Web page, or with one same Internet address repeated several times, and which eliminates, through human contribution, the spurious Web pages, i.e. those containing information noise and/or derived from not very reliable sources.

In accordance with such solution idea, the method for classifying Web pages and organising corresponding contents according to the present invention comprises:
  a recording step of a predetermined number of Internet addresses, comprising executions of a plurality of automatic recording procedures of the plurality of Internet addresses,
  a step of selecting and setting a corresponding pertinence value to the plurality of Internet addresses,
  characterised in that
  the selection step sets the corresponding pertinence value to a pertinence value proportional to its recording in the recording step and selects the Internet addresses with pertinence value greater than a predetermined threshold value, the method furthermore comprising a reduction step which, from among the Internet addresses with pertinence value greater than said threshold value, reduces the Internet addresses to the Internet addresses having one or more essentiality criteria, and a validation step for validating a subset of the Internet addresses responding to the essentiality criteria, the validation step comprising a human action.

Advantageously, according to the Web page classification method of the present invention, an identification script or program is capable of providing a result pertaining to a search criterion set by a user, not redundant in terms of Web page repetition and reliable for Web page content, and considerably reducing the time employed by the user in order to filter the search results.

Further characteristics and advantages of the classification method according to the invention will be clearer from the following description of an embodiment thereof, made as indicative and non-limiting with reference to the enclosed drawings.

BRIEF DESCRIPTION OF THE DRAWINGS

In such drawings:

FIG. 1a shows a number of Web pages detected with the identification script or program of FIG. 1;

DETAILED DESCRIPTION

Figure 1:
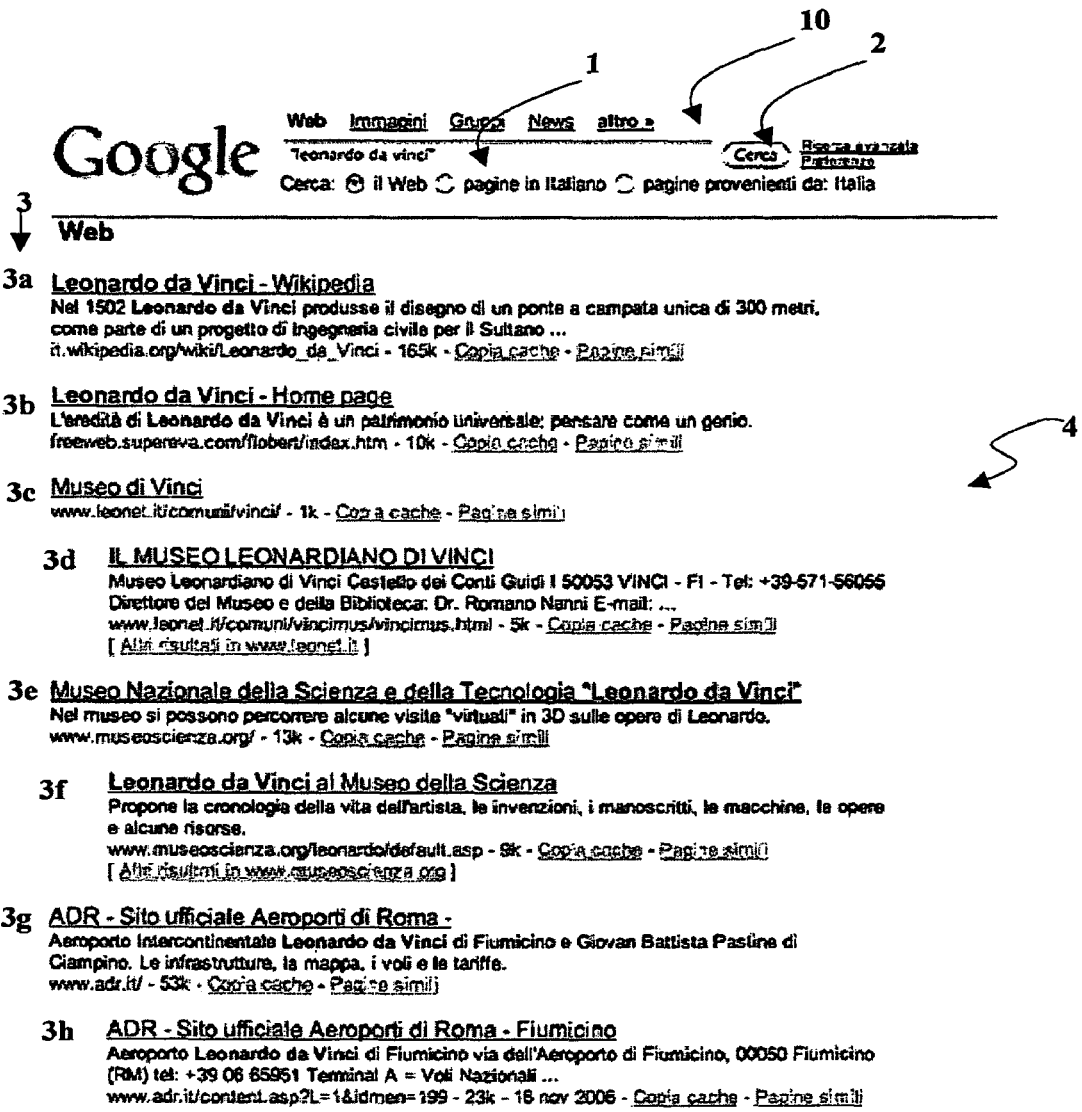
FIG. 1 shows a graphical interface for an identification script or program, according to the prior art.
Figure 1B:
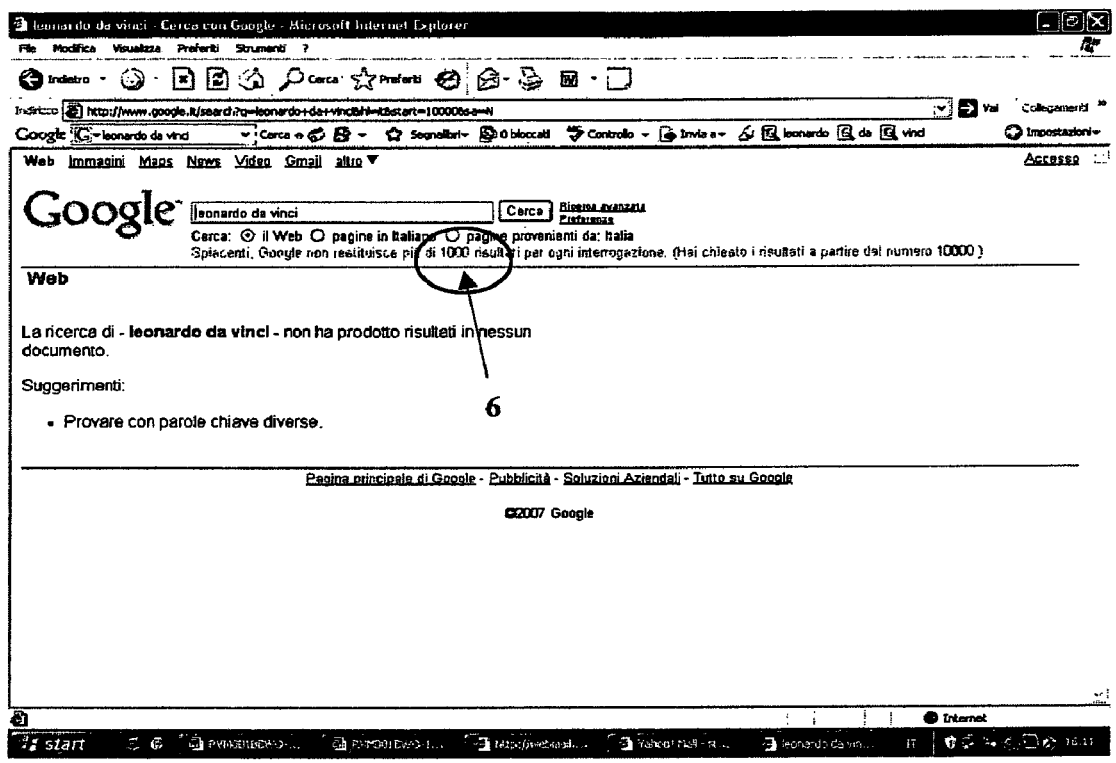
FIG. 1b shows an error message reported by the identification script or program of FIG. 1.

With reference to the enclosed figures, the present invention describes a Web page classification method comprising a plurality of steps.

In particular, the method comprises a first configuration step which provides the definition of thematic areas for the Web page classification.

As an example and without reducing the scope of protection of the present invention, by thematic area it is intended a portion of knowledge, for example technology, art, literature, sport, current events and is defined by a set of descriptive words of such knowledge portion.

The configuration step comprises the definition of a plurality of lemmas for each thematic area.

Only for clarity and without limiting the scope of the invention, the term lemma is used to indicate headwords and other forms of abstract units of morphological analysis in linguistics, each abstract unit roughly corresponding to a set of words that are different forms of the same word.

For example, "run", "runs", "ran" and "running" are forms of a same abstract unit in the English language, conventionally or canonically written as RUN. The abstract unit RUN is included in a lemma X, comprising a plurality of abstract units having an association with the abstract unit RUN.

In addition, each thematic area is associated with multiple area key words, some of which are associated with single lemmas. A lemma belonging to more than one thematic area is associated with a plurality of key words belonging to the corresponding thematic areas.

For example, in the configuration step, the search criterion "Leonardo da Vinci" is configured as a lemma to which the area key words "Painting", "Renaissance", "Sculpture" are associated, words belonging to the thematic area "Art". The entry "Leonardo da Vinci" is also associated with the area key words of "Canals", "Hydraulics", belonging to the thematic area "Engineering".

Still more in particular, a main language is also defined in the configuration step, for example Italian, for the creation of the thematic areas, lemmas and area key words correlated thereto.

In the configuration step, a plurality of allowed languages is also set, for example distinguished by a same alphabet, and used in a reduction step as will be explained below.

The main language and the allowed languages permit carrying out simple and complex searches in one's own language, also obtaining Web pages in another language. In other words, setting the lemma "Leonardo da Vinci", a result according to the classification method of the present invention permits identifying not only the Web pages in Italian containing the lemma "Leonardo da Vinci", but also the Web pages of the languages allowed in the configuration step.

The classification according to the present invention then comprises a recording step, for storing a predetermined number of Internet addresses of Web pages, on the basis of the thematic areas and corresponding lemmas defined in the configuration step. Such predetermined number of Internet addresses of Web pages can be configured in the configuration step.

In particular, the recording step determines the association of a Web page with one or more lemmas, for example by means of the identification of the lemma in the Web pages. For every Web page associated with a lemma, its Internet address is stored.

Still more in particular, the execution of the recording step is carried out by a plurality of automated processes, for example comprising a spidering process.

Such spidering process, starting from a Web page x, associated with a specific lemma, records the Internet addresses of the Web pages z1, ..., zn, directly connected with such Web x page. The spidering process is also capable of recording the Internet addresses of the Web pages y1, ..., yn, to which the Web page x is indirectly connected, by means of the Web pages z1, ..., zn.

Advantageously, the spidering process can be configured for carrying out only one direct recording of the Web pages, i.e. of the Web pages directly reachable from a Web page x, or for carrying out an indirect recording as described above.

The recording step then provides for storing the Internet addresses, with reference to the specific lemma, inside a database, whose content represents an information layer for the classification method. In particular, the pertinence, redundancy, reliability and information noise of the information layer are optimised according to the classification method of the invention, as will be evident from the following description.

It is worth to note that the method of the present invention provides to classify and organize not only Web pages but, substantially, any Social Network Service.

More particularly, the term Social Network Service is used to identify an internet based service for sharing interests and activities among online communities of people who are interested in exploring the interests and activities of others.

Most Social Network Services are primarily Web based and provide a collection of various ways for users to interact, such as chat, messaging, email, video, voice chat, file sharing, blogging, discussion groups, and so on. The main types of Social Network Services are those which contain directories of some categories and means to connect with friends.

The recording step according to the method of the invention, provides for storing not only Web pages but also a predetermined number of Social Network Services, on the basis of the thematic areas and corresponding lemmas defined in the configuration step, determining, for each Social Network Service, its association with one or more lemmas. Even in this case, for every Social Network Service associated with a lemma, the corresponding Internet address is stored. In this way, the definition of lemmas and thematic area provides to implement a classification and organization which, on a predetermined search criterion, extract a collection of Web pages and Social Network Services which are both free of noise, pertinent, not redundant and reliable.

For example, considering as a search criterion the word "child", an identification script or program of the known art is limited to the identification of a great number of document including the word "child" while the classification and recording steps of the invention provides a plurality of Web pages and Social Network Services associated to the lemma including the abstract unit whereto the word "child" belongs.

With reference to the example above, Web pages and Social Network Services including not only the word "child" but also words like "children", "boy" and similar are classified and organized according to the method of the present invention.

For the sake of clarity, the information layer or information repository resulting from the recording step will be indicated below as the first information layer.

In particular, the recording step comprises the execution of other automated processes, comprising for example meta-search engine functions. As known, such functions provide for the identification of a plurality of Web pages, belonging to a lemma, by means of the consultation of different search engines that classify the Web pages according to their own classification method.

In other words, the meta-search engine functions query a plurality of search engines in order to determine a plurality of Web pages comprising a specific lemma, already stored by such search engines, according to their own classification. Examples of known search engines are Google, Yahoo, Altavista and the like.

The Internet addresses of the Web pages identified by the meta-search engine functions are inserted in the first information layer or repository. In addition, the recording step stores, in the first information layer, a copy of the Web page. Such copy is used both for consultation and for comparison with a subsequent version thereof, identified by a subsequent spidering action so to make available an update of the Web page itself inside the first information layer.

In accordance with the present invention, the classification method furthermore comprises a selection step which carries out the comparison of the Internet addresses stored by the automated processes in the recording step.

In particular, the Internet addresses recorded by means of the spidering process, for a certain lemma, are compared with the Internet addresses recorded by means of the meta-search engine functions. If an Internet address was identified both by the spidering process or in the configuration step, and by the meta-search engine functions, it is confirmed in such selection step. In fact, its presence in different search engines and its identification in the configuration step are indicative of a high probability of pertinence of its content, with reference to a specific lemma.

The recording step advantageously comprises different types of automated processes, not necessarily based on spidering processes, in the configuration step or on meta-search engine functions. Based on the recordings carried out by all the automated processes, the selection step carries out the comparison of the identified Internet addresses, carrying out a statistic matching, i.e. assigning the Internet addresses a probable pertinence and reliability value which increases with its frequency of recording by the automated processes.

According to the selection step of the present invention, the first information layer is refined to form a second information layer or repository, which comprises the Internet addresses having a probable pertinence and reliability value above a pre-established threshold. The second information layer is for example contained in the database mentioned above or in a separate database.

The second information database, even if it comprises Internet addresses with probably high pertinence value, represents potentially redundant content. Indeed, by virtue of the probably high pertinence value assigned during selection, different Internet addresses could refer to the same Web page, for example to several versions of the same Web page translated into different languages, or to non-updated but still published versions of the same Web page, or to the same information content stored in Web pages belonging to different domains.

In order to improve the content of the second information repository, the classification method according to the invention comprises a reduction step of the Internet addresses confirmed during the selection step.

Such reduction step provides that every Web page, directed by an Internet address of the second information layer, respects an essentiality criterion.

Such essentiality criterion provides for, for example, the elimination of all the Web pages or Social Network Services not corresponding to an allowed language, set in the configuration step. In addition, the essentiality criterion comprises the elimination of Web pages coming for the same lemma from an identical domain or thematic area, reporting instead the main page thereof.

The reduction step, by verifying the satisfaction of the essentiality criterion, establishes the presence of the corresponding Internet address in a third, further refined information layer or repository.

Advantageously, an identification script or program executed on the third information layer or repository is capable of identifying Internet addresses of Web pages or Social Network Services with high pertinence probability, substantially eliminating redundancy.

For exemplifying and non-limiting purposes, an identification script or program based on the "Leonardo da Vinci" search criterion, supported by the classification method of the present invention, is capable of determining several hundred Internet addresses already in this step, with high probability of pertinence and substantially not redundant, while an identification script or program supported by a classification method according to the prior art identifies millions of Internet addresses in the final selection.

According to the present invention, a further validation step on the third information layer is provided for, aimed to determine the single Internet addresses which refer to highly reliable Web pages, substantially lacking information noise.

Such validation step comprises the execution of a validation interface which lists the Internet addresses or Social Network Services of the third information layer. More in particular, the validation interface proposes an ordering of such Internet addresses according to a probable pertinence value already assigned in the previous recording, selection and reduction steps.

Through the validation interface, an especial operator analyses the Web pages and Social Network Services associated to the Internet addresses and validates those pertinent, with respect to a specific lemma. More specifically, the operator eliminates, through the graphical interface and with the aid of automatic comparison processes and signaling of the results, the Internet addresses with low or zero reliability, those impertinent and undesired, for example preventing the Internet address referring to "Leonardo da Vinci" airport from being inserted in the fourth information layer.

According to the present invention, a specific function, for example a check box for validation, may be dedicated to the final users for executing the validation step described above. The final user analyses the Web pages and Social Network Services and validates those considered more pertinent. This is a further improvement in the phase of validation operated by the especial operator because the final users expert in respective fields, may give their validation on Web pages and Social Network Services and contribute to a development and refinement of a the information layer or repository.

According to a first preferred embodiment, if the set of Web pages and Social Network Services validated by the final users is different from the set of Web pages and Social Network Services validated by the especial operators, they are listed in separated lists of an interface reporting the respective results.

According to a second embodiment, the Web pages and Social Network Services of the third information layer is validated by both the final users and the especial operator.

Advantageously, the human contribution is substantial for the definition of the fourth information layer, deriving from a manual selection of the Internet addresses of the third information layer.

Therefore, according to the classification method of the present invention, the classification of the Web pages comprises at least the following steps:

A) A recording step of a predetermined number of Internet addresses, comprising executions of a plurality of automatic recording processes of said plurality of Internet addresses.

B) A selection step, for setting a corresponding pertinence value to the plurality of Internet addresses; such selection step sets the corresponding probable pertinence value to a value proportional to its recording in said recording step and selects the Internet addresses with pertinence value greater than a predetermined threshold.

C) A reduction step which eliminates, from among the Internet addresses with pertinence value greater than the threshold, the Internet addresses not meeting one or more essentiality criteria.

D) A validation step for validating a subset of the Internet addresses meeting the essentiality criteria. Such validation step comprises a manual action, executed by a user.

Figure 2:
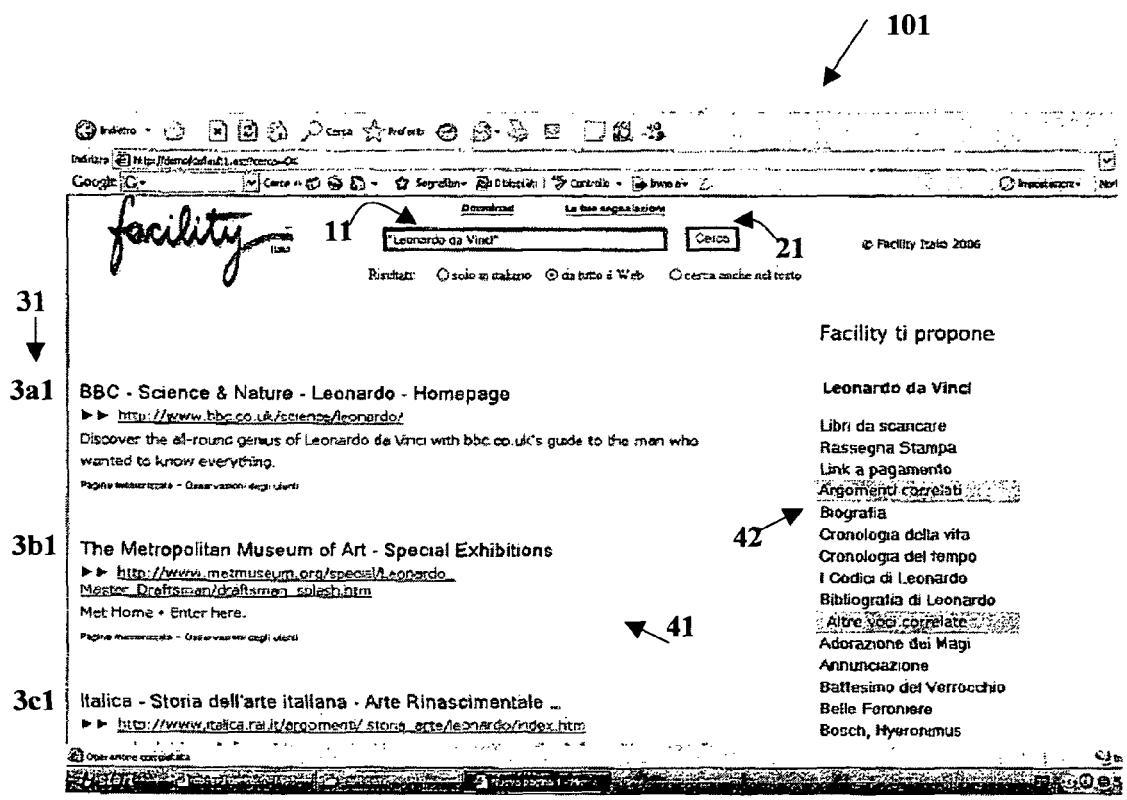
FIG. 2 shows a graphic interface for an identification script or program, according to the classification method of the present invention.

For example, on the search criterion "Leonardo da Vinci", an identification script or program according to the invention is capable of determining several dozen Internet addresses, as represented in FIG. 2.

In particular, FIG. 2 represents a identification script or program of Web pages, which can be drawn from an interface 101, for example a Web page comprising an insertion bar or portion 11 of a search criterion and an activation button 21 for the activation of the identification script or program.

In FIG. 2, a search criterion is set for the identification of Web pages pertaining to the Italian inventor and artist Leonardo da Vinci.

A main portion 41 of the interface 101 displays the results of the identification script or program after its execution, on the basis of the search criterion "Leonardo da Vinci". In particular, the result of the search comprises a list 31 of Internet addresses of Web pages, of which only the first hits 3a1-3c1 are displayed.

Advantageously, the identification script or program is capable of providing the final user with several dozen Internet addresses, which identify very pertinent, reliable Web pages and Social Network Services and without noise or redundancy. The Internet address 3a1 refers to a Web page of the BBC, Internet address 3b1 to the Metropolitan Museum and Internet address 3c1 to a report by the RAI, well-known Italian television station, dedicated to the inventor Leonardo da Vinci.

The identification script or program therefore discards a plurality of Web pages which have low relevancy with the search criterion set by the user, proposing only the Web pages belonging to the fourth information layer.

For a search of classic type, the interface 101 permits executing the identification script or program on an information layer or repository which is less refined than the fourth information layer, for example on the second information type.

For example, by selecting the button 61 in FIG. 2, the identification script or program provides a list of Internet addresses contained in the second information layer, thus also allowing the consultation of the Web pages on which the human validation step was not carried out.

More particularly, it is also provided to activate a subsidiary execution of the method of classification in the cases wherein the third information layer or repository resulted from the selection step or the fourth information layer or repository resulted from the reduction step are substantially empty and no result may be furnished for a certain search criterion. In this case, the subsidiary execution is based on an algorithm that provides to access a predetermined set of web searches engines and to extract from such engines the most pertinent results for the search criterion.

Advantageously, the interface 101 also comprises a lateral portion 42 which offers information of encyclopaedic type, in hypertext form, correlated with a set search criterion. For example, for the search criterion "Leonardo da Vinci", the lateral portion 42 offers the Biography, Life Chronology, Time Chronology, Leonardo Codices, and Leonardo Bibliography.

Advantageously, according to the classification method of Web pages of the present invention, an identification script or program is capable of providing a pertinent result, thus without noise, for a search criterion set by a user, not redundant in terms of number and repetition of the Web pages and reliable for Web page content, considerably reducing the time employed by the user for filtering the search results.

As it may be appreciated from the following description, the method for classifying Web pages and Social Network Services according to the present invention does not only provide precise, pertinent, not redundant and free of noise information associated to a search criterion but also an interface which is of great facility of use.

Figure 3:
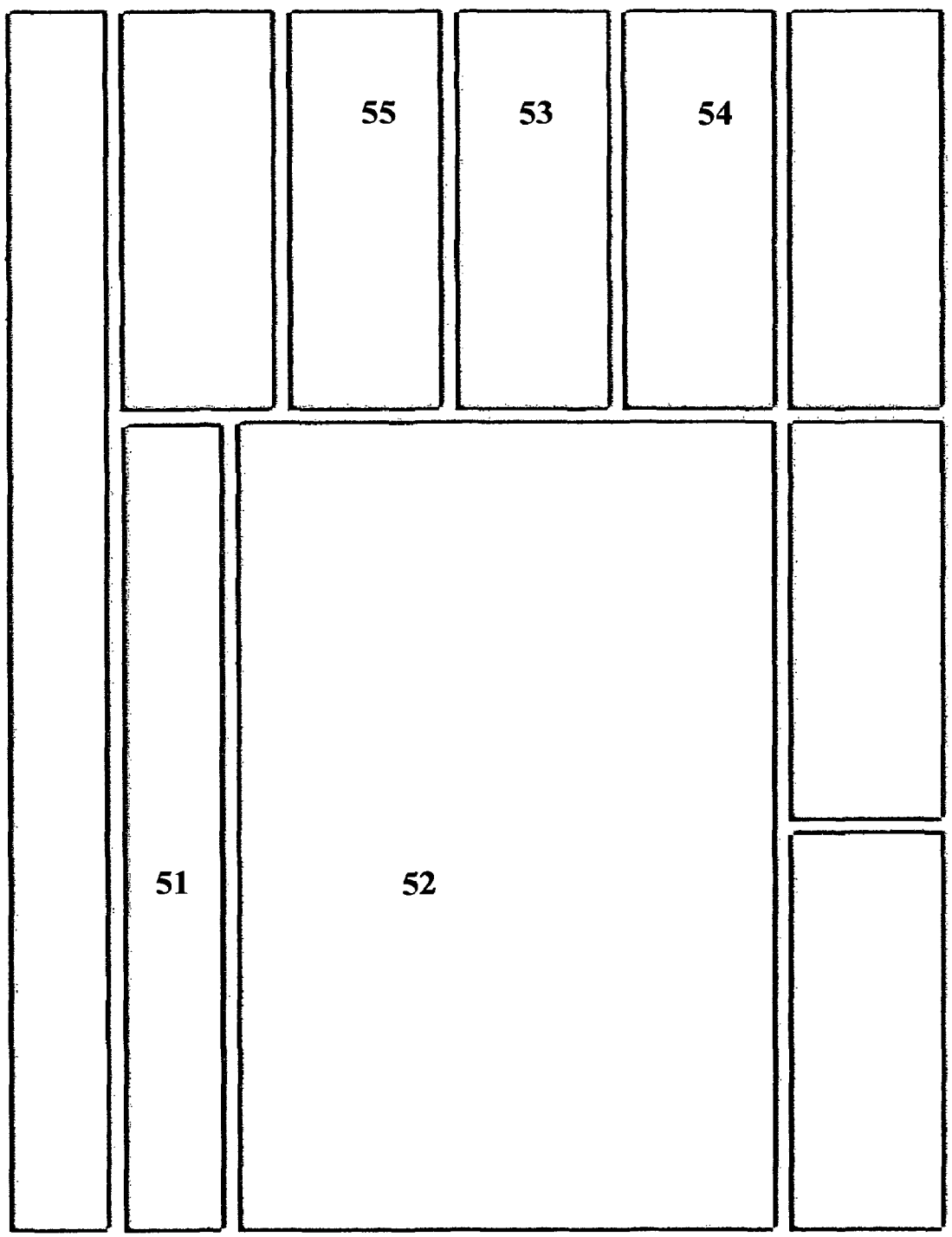
FIG. 3 schematically shows the organization of the contents according to the method of the present invention.

With reference to FIG. 3 it is schematically represented a user interface 50 provided by the method of the present invention as a starting point for the execution of a classification of Web pages and Social Network Services and the corresponding organisation of contents. The user interface 50 is for example associated to an internet address of a web application, substantially implementing the method.

The user interface 50 includes a search box 51 for inserting a search criterion, a search result box 52 for listing the Web pages resulted from the execution of the method, and a plurality of additional boxes 53 including additional information associated to the search criterion.

The additional boxes 53 includes a box 54 wherein one or more Social Network Services are listed, a box 55 for arguments correlated to the search criterion, for example provided by a third party, and a box 56 including comments of the users.

More particularly, the arguments provided by the third party are substantially a plurality of information deriving from one or more databases furnished by the third party, elaborated and reorganized according to the method of the invention and returned in a list of links inside the box 55. In other words, the content of the box 55 is a proprietary result of a search based on the predetermined search criterion set by the user.

Advantageously, the method of the present invention is based on a Web 2.0 Mashup technology combining data from more than one source into the single integrated user interface 50.

In fact, the results detected through the recording, selection, reduction and validation steps according to the method of the invention, derives from a plurality of sources, including not only Web pages but also Social Network Services and third party contents.

The Mashup technology implemented on the Web pages, Social Network Services and contents thereby creates a new and distinct tool that is not originally provided by the single source wherefrom such Web pages, Social Network Services and contents derive.

It is worth to note that this is a great improvement with respect to the known services implemented on Mashup technology. In fact, the known services provide to group in a single interface a plurality of information deriving from different sources but they fail to associate such plurality of information to a common search criterion.

Advantageously, the present invention, first detects a plurality of contents associated to a common search criterion of the search box and then groups such contents inside the above mentioned boxes 52, 53, 54, 55 of the user interface 50.

Figure 4:
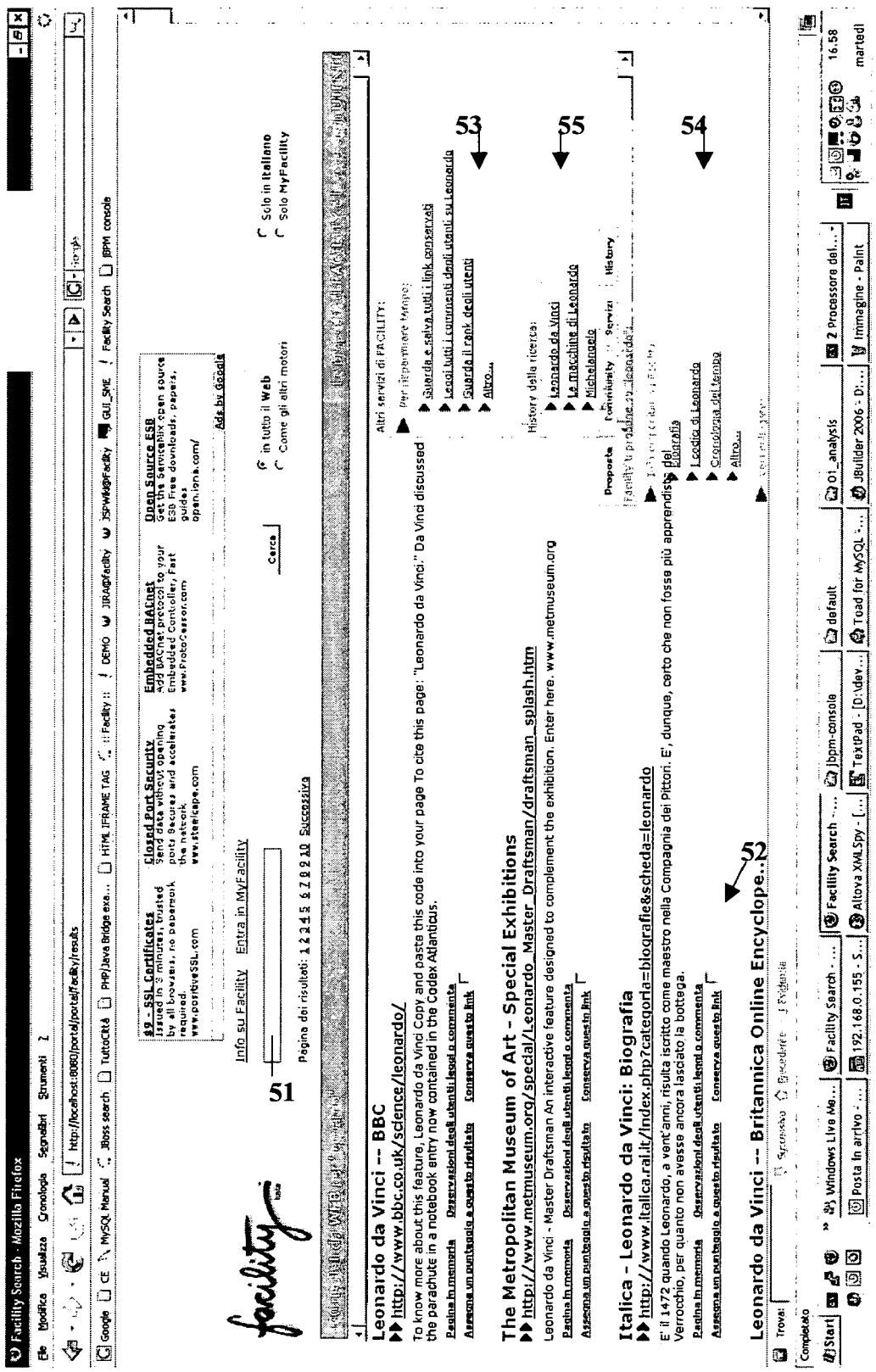
FIG. 4 shows in major detail the organization of the contents after an execution, on a predetermined search criterion, of the method of the present invention.

With reference to FIG. 4 it is shown in major detail the user interface 50 as result of the method on the search criterion "Leonardo Da Vinci"

Each box 51-54 of the user interface 50 is implemented with widget technology in order to be modifiable by the user, for example by drag and drop from a first to a second position of the interface or increasing/reducing the size of a first box in order to display a major number of links in another box, i.e. the box of the Web pages.

One or more boxes may also be turned on or off, in other words removed or inserted from the user interface 50.

Advantageously, the user may choose, among the results provided, the type of information whereon he is interested, for example reserving a major portion of the user interface 50 for the Web pages or for a specific Social Network service or for the content provided by a third party or for the comment of the other user.

The invention claimed is:

1. A method for classifying Web pages, the method comprising the steps of:
   defining lemmas;
   recording a predetermined number of Internet addresses of Web pages associated with said lemmas, said recording step comprising executing a plurality of automatic processes for identifying said Internet addresses;
   setting, by a processor, a pertinence value for each of said Internet addresses, said pertinence value for each Internet address being set to a value proportional to a number of times that Internet address is identified by said automatic processes;
   selecting the Internet addresses with pertinence values greater than a predetermined threshold value;
   selecting, from among said Internet addresses with pertinence values greater than said threshold value, the Internet addresses meeting one or more essentiality criteria, said step of selecting the Internet addresses meeting one or more essentiality criteria comprising eliminating Internet addresses of Web pages from an identical domain for the same lemma; and
   validating a subset of said Internet addresses meeting the essentiality criteria, said validating step comprising human action.

2. The method according to claim 1, wherein said step of defining lemmas comprises a sub-step of defining a plurality of thematic areas and defining a plurality of area key words associated with each of the thematic areas.

3. The method according to claim 2, wherein said step of defining lemmas further comprises a sub-step of defining a plurality of lemmas for each of said thematic areas.

4. The method according to claim 3, wherein said step of defining lemmas further comprises a sub-step of associating one of said lemmas with one or more of said thematic areas.

5. The method according to claim 4, wherein said step of defining lemmas further comprises a sub-step of defining a main language of said lemmas and said area key words.

6. The method according to claim 4, wherein said step of defining lemmas further comprises a sub-step of setting said predetermined number of Internet addresses.

7. The method according to claim 4, wherein said recording step comprises a sub-step of associating said lemmas with said Web pages.

8. The method according to claim 7, wherein said associating sub-step comprises identifying said lemmas in said Web pages.

9. The method according to claim 8, wherein said recording step further comprises storing said Internet addresses, with reference to said lemmas, in a first information layer.

10. The method according to claim 9, wherein said recording step further comprises storing a copy of said Web pages in said first information layer.

11. The method according to claim 8, wherein said step of selecting the Internet addresses meeting one or more essentiality criteria further comprises eliminating Internet addresses of Web pages not comprising alphabets of allowed languages.

12. The method according to claim 8, wherein said step of selecting the Internet addresses meeting one or more essentiality criteria further comprises executing a plurality of selection queries.

13. The method according to claim 12, wherein said validating step comprises executing a validation interface.

14. The method according to claim 13, wherein said validation interface lists said Internet addresses eliminated by said step of selecting the Internet addresses meeting one or more essentiality criteria.

15. The method according to claim 1, wherein said recording step comprises executing at least one spidering process.

16. The method according to claim 15, wherein said recording step further comprises executing at least one meta-search engine function.

17. The method according to claim 1, wherein the automatic processes for identifying the Internet addresses comprises a plurality of search processes that generate the Internet addresses of Web pages as search results.

18. A non-transitory computer-readable storage medium encoded with a computer program for classifying Web pages, the computer program containing instructions for performing the steps of:

receiving lemmas that have been defined;

recording a predetermined number of Internet addresses of Web pages associated with said lemmas, said Internet addresses being identified by a plurality of automatic processes;

setting, by a processor, a pertinence value for each of said Internet addresses, said pertinence value for each Internet address being set to a value proportional to a number of times that Internet address is identified by the automatic processes;

selecting the Internet addresses with pertinence values greater than a predetermined threshold value;

selecting, from among said Internet addresses with pertinence values greater than said threshold value, the Internet addresses meeting one or more essentiality criteria, said step of selecting the Internet addresses meeting one or more essentiality criteria comprising eliminating Internet addresses of Web pages from an identical domain for the same lemma; and determining a subset of said Internet addresses meeting the essentiality criteria based at least partially on human action.

19. A computer system for classifying Web pages, the computer system comprising at least one processor programmed to:

receive lemmas that have been defined;

record a predetermined number of Internet addresses of Web pages associated with said lemmas, said Internet addresses being identified by a plurality of automatic processes;

set a pertinence value for each of said Internet addresses, said pertinence value for each Internet address being set to a value proportional to a number of times that Internet address is identified by the automatic processes;

select the Internet addresses with pertinence values greater than a predetermined threshold value;

select, from among said Internet addresses with pertinence values greater than said threshold value, the Internet addresses meeting one or more essentiality criteria, this selection comprising eliminating Internet addresses of Web pages from an identical domain for the same lemma; and determine a subset of said Internet addresses meeting the essentiality criteria based at least partially on human action.

\* \* \* \* \*